(12) United States Patent
Carpenter et al.

(10) Patent No.: US 10,452,273 B2
(45) Date of Patent: Oct. 22, 2019

(54) PREEMPTIVE EVENT-BASED DATA MIGRATION

(71) Applicant: International Business Machines Corporation, Armonk, NY (US)

(72) Inventors: Preston A. Carpenter, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/275,365

(22) Filed: Sep. 24, 2016

(65) Prior Publication Data

US 2018/0088802 A1    Mar. 29, 2018

(51) Int. Cl.
G06F 12/00    (2006.01)
G06F 13/00    (2006.01)
G06F 13/28    (2006.01)
G06F 3/06    (2006.01)

(52) U.S. Cl.
CPC .............. *G06F 3/061* (2013.01); *G06F 3/067* (2013.01); *G06F 3/0647* (2013.01); *G06F 3/0613* (2013.01)

(58) Field of Classification Search
CPC ............................... G06F 3/061; G06F 3/0613
USPC ........................................................ 711/165
See application file for complete search history.

(56) References Cited

U.S. PATENT DOCUMENTS

| | | |
|---|---|---|
| 5,440,686 A | 8/1995 | Dahman et al. |
| 8,315,995 B1 | 11/2012 | Levy |
| 8,375,180 B2 | 2/2013 | Chiu et al. |
| 8,417,816 B2 | 4/2013 | Esteban et al. |
| 8,533,183 B2 | 9/2013 | Hokanson |
| 8,838,620 B2 | 9/2014 | Dao et al. |
| 8,880,830 B1 | 11/2014 | Akutsu et al. |
| 8,935,493 B1 | 1/2015 | Dolan et al. |
| 9,317,203 B2 | 4/2016 | Coronado et al. |
| 9,335,948 B1 | 5/2016 | Kirac et al. |
| 9,665,630 B1 * | 5/2017 | Bigman .............. G06F 17/3053 |
| 2008/0201542 A1 * | 8/2008 | Maruyama ............ G06F 3/0607 711/165 |
| 2012/0089562 A1 * | 4/2012 | Deremigio ........ G06F 17/30563 707/602 |
| 2012/0137059 A1 | 5/2012 | Yang et al. |

(Continued)

*Primary Examiner* — Charles Rones
*Assistant Examiner* — Sidney Li
(74) *Attorney, Agent, or Firm* — Nelson and Nelson; Daniel P. Nelson; Alexis V. Nelson (57) ABSTRACT

A method for preemptively migrating data in a tiered storage system is disclosed. In one embodiment, such a method includes identifying a regularly scheduled event that is associated with an increase in I/O activity. The method further identifies a virtual storage resource (e.g., file, data set, logical volume) associated with the increase in I/O activity. A timeline is then analyzed to determine timing for the regularly scheduled event. The method automatically promotes the virtual storage resource from lower-performing storage media to higher-performing storage media immediately prior to a start of the regularly scheduled event. The method automatically demotes the virtual storage resource to the lower-performing storage media after completion of the regularly scheduled event. A corresponding system and computer program product are also disclosed.

20 Claims, 7 Drawing Sheets

(56) References Cited

U.S. PATENT DOCUMENTS

2013/0036266 A1 2/2013 Naganuma et al.
2015/0058527 A1 2/2015 Venkata

* cited by examiner

PREEMPTIVE EVENT-BASED DATA MIGRATION

BACKGROUND

Field of the Invention

This invention relates to systems and methods for preemptively migrating data in a tiered storage system.

Background of the Invention

In today's tiered storage architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

In tiered storage architectures, determining when to migrate data as well as what data to migrate is a significant issue. Some tiered storage architectures may promote data elements to higher performance storage media without any knowledge of how the data elements relate to logical storage resources, such as files, data sets, and/or logical volumes. This may result in part of a file, data set, or logical volume being migrated instead of the entire file, data set, or logical volume.

The timing associated with migrating data may also be an important issue, since it may significantly affect I/O performance. In some cases, migrating data to higher performance storage media when the data is in high demand may significantly reduce I/O performance and throughput during the migration. Migrating data at inopportune times may be self-defeating as the goal of the migration may be that of ultimately improving I/O performance.

In view of the foregoing, what are needed are systems and methods to more optimally migrate data in tiered storage architectures. Ideally, such systems and methods will improve I/O performance and throughput by more optimally addressing when to migrate data and what data to migrate.

SUMMARY

The invention has been developed in response to the present state of the art and, in particular, in response to the problems and needs in the art that have not yet been fully solved by currently available systems and methods. Accordingly, systems and methods are disclosed to preemptively migrate data in tiered storage systems. The features and advantages of the invention will become more fully apparent from the following description and appended claims, or may be learned by practice of the invention as set forth hereinafter.

Consistent with the foregoing, a method for preemptively migrating data in a tiered storage system is disclosed. In one embodiment, such a method includes identifying a regularly scheduled event that is associated with an increase in I/O activity. The method further identifies a virtual storage resource (e.g., file, data set, logical volume) associated with the increase in I/O activity. A timeline is then analyzed to determine timing for the regularly scheduled event. The method automatically promotes the virtual storage resource from lower-performing storage media to higher-performing storage media immediately prior to a start of the regularly scheduled event. The method automatically demotes the virtual storage resource to the lower-performing storage media after completion of the regularly scheduled event.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
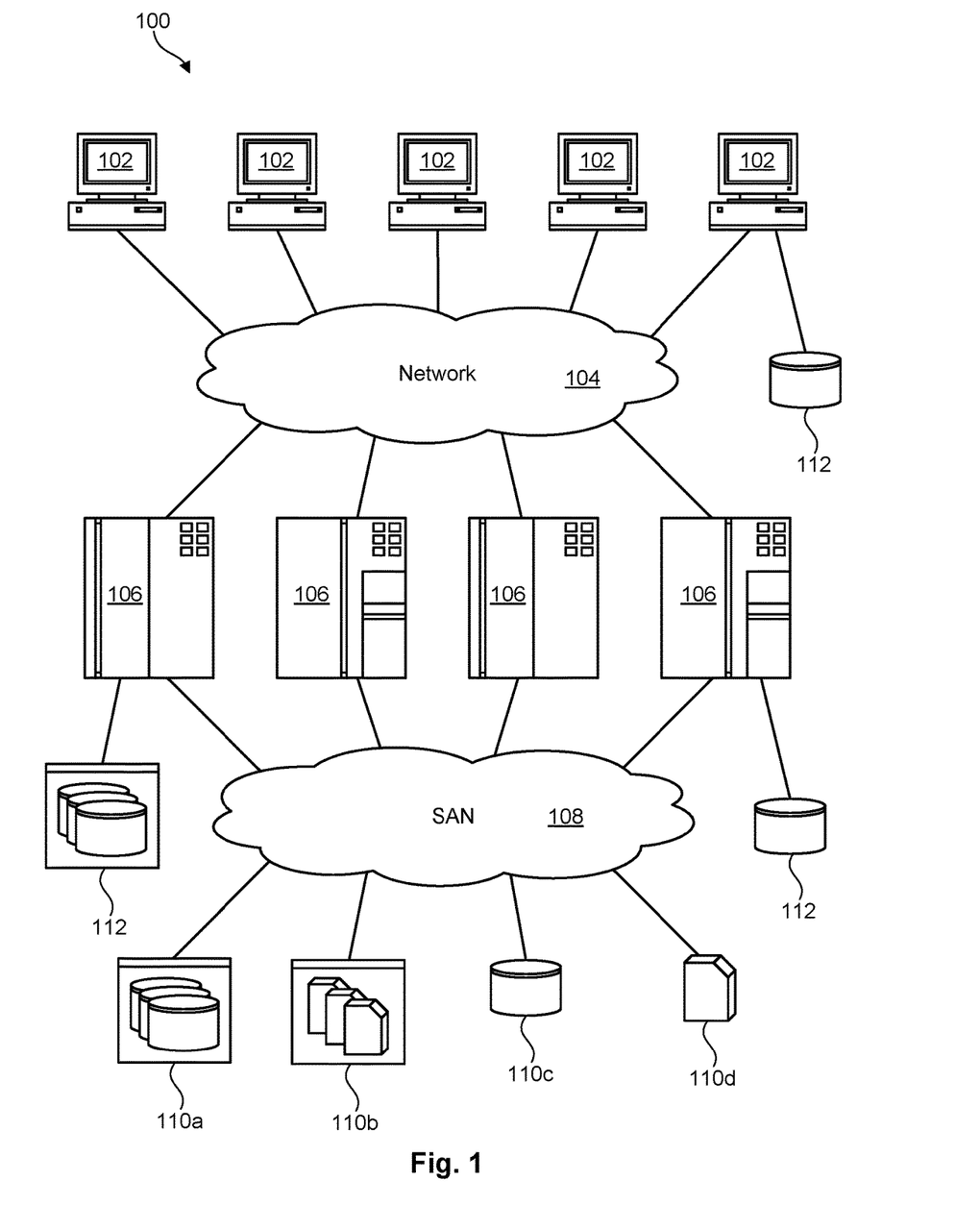
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
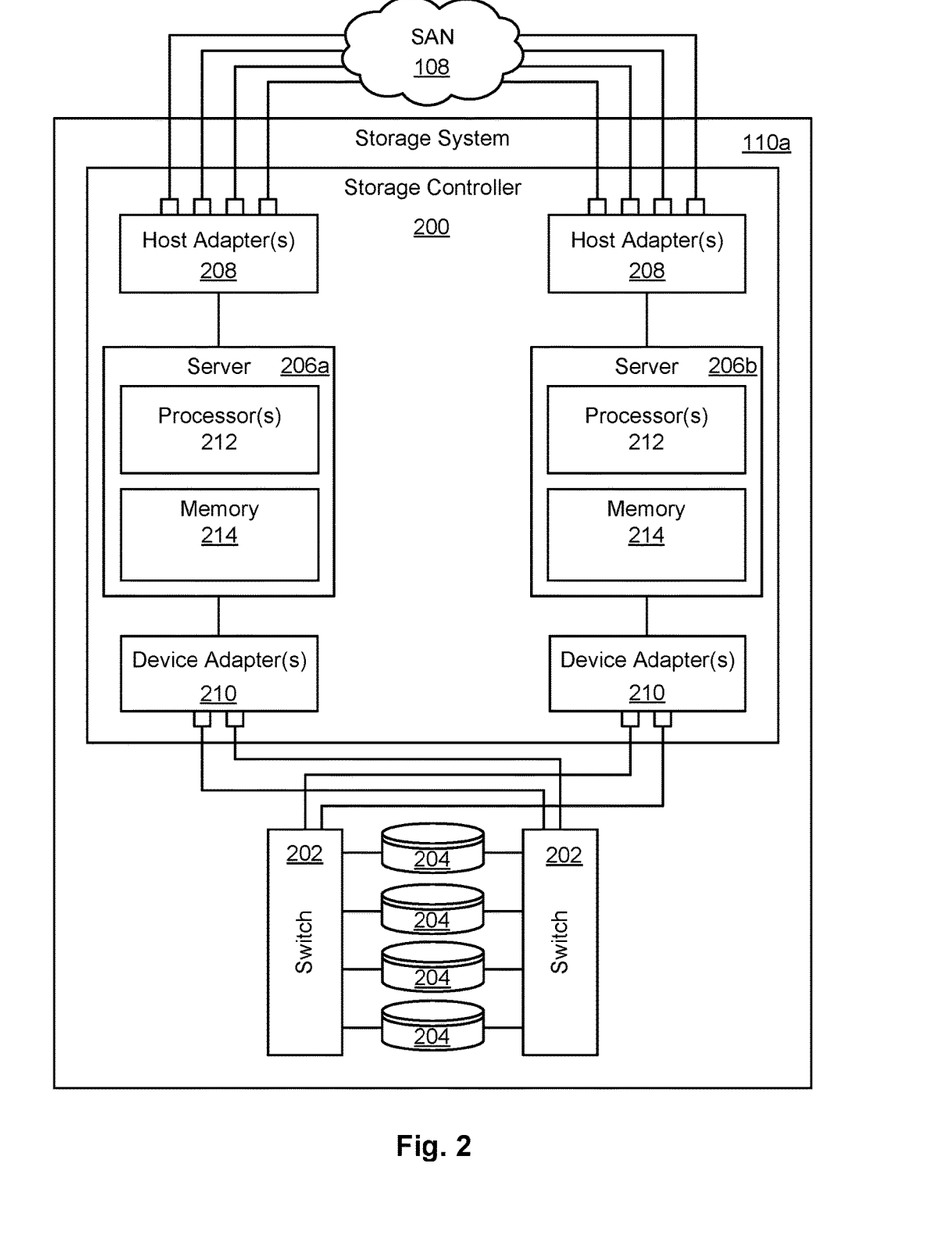
FIG. 2 is a high-level block diagram showing one example of a storage system that may contain higher performance storage media and lower performance storage media.

Referring to FIG. 2, one embodiment of a storage system 110a containing an array of hard-disk drives 204 and/or solid-state drives 204 is illustrated. The internal components of the storage system 110a are shown since the event-based, preemptive data migration disclosed herein may be performed within such a storage system 110a, or to and/or from such a storage system 110a. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

Figure 3:
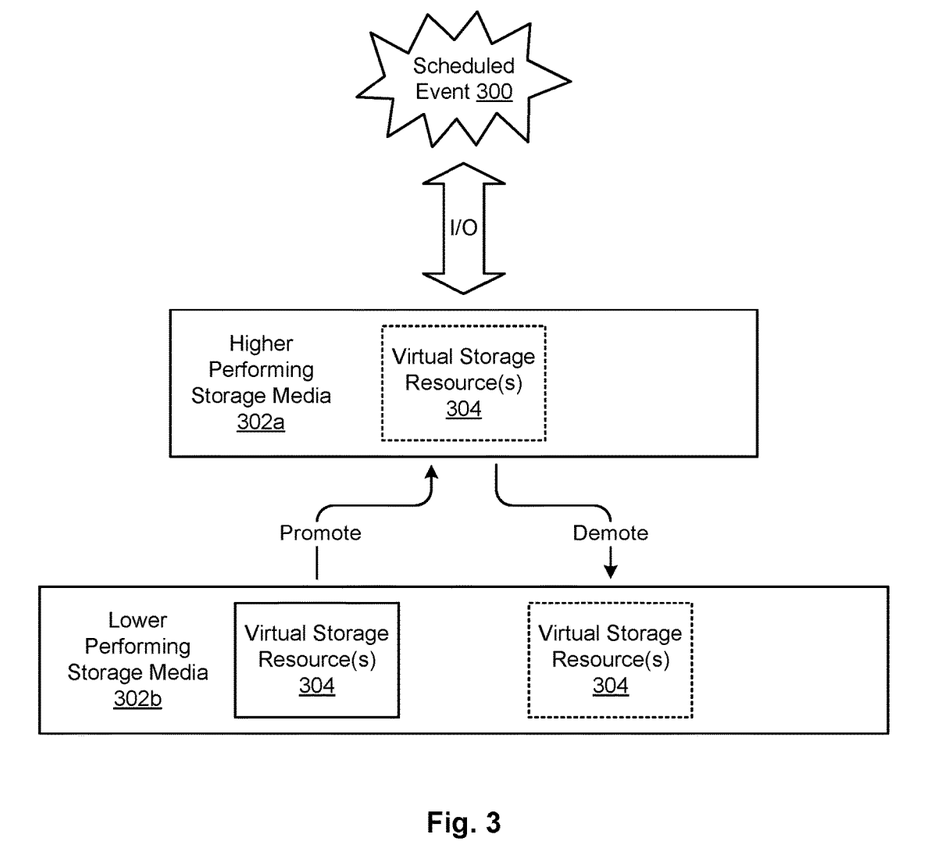
FIG. 3 is a high-level block diagram showing preemptive movement of a virtual storage resource between higher performance storage media and lower performance storage media to accommodate I/O associated with an event.

Referring to FIG. 3, in certain cases, various events 300 may occur that are associated with an increase in I/O activity to particular data sets, files, and/or logical volumes (hereinafter refereed to as "virtual storage resources 304" since the resources may be virtualized and do not necessarily correspond to physical drives and/or storage locations) on a storage system 110 such as that illustrated in FIG. 2. For example, events 300 such as data backups, application use during business hours, online transactions, batch jobs, stock-exchange trading, and the like may be associated with an increased level of I/O activity to particular virtual storage resources 304.

Systems and methods in accordance with the invention may be configured to anticipate such events 300 and move particular virtual storage resources 304 from lower-performing storage media 302b (e.g., hard disk drives 204) to higher-performing storage media 302a (e.g., solid state drives 204) to improve I/O performance during the events 300. This will increase I/O throughput during an event 300 and reduce the amount of time needed for tasks to complete. After an event 300 is complete, the virtual storage resources may be moved back to lower-performing storage media 302b, thereby freeing up higher-performing storage media 302a for other uses or data.

Figure 4:
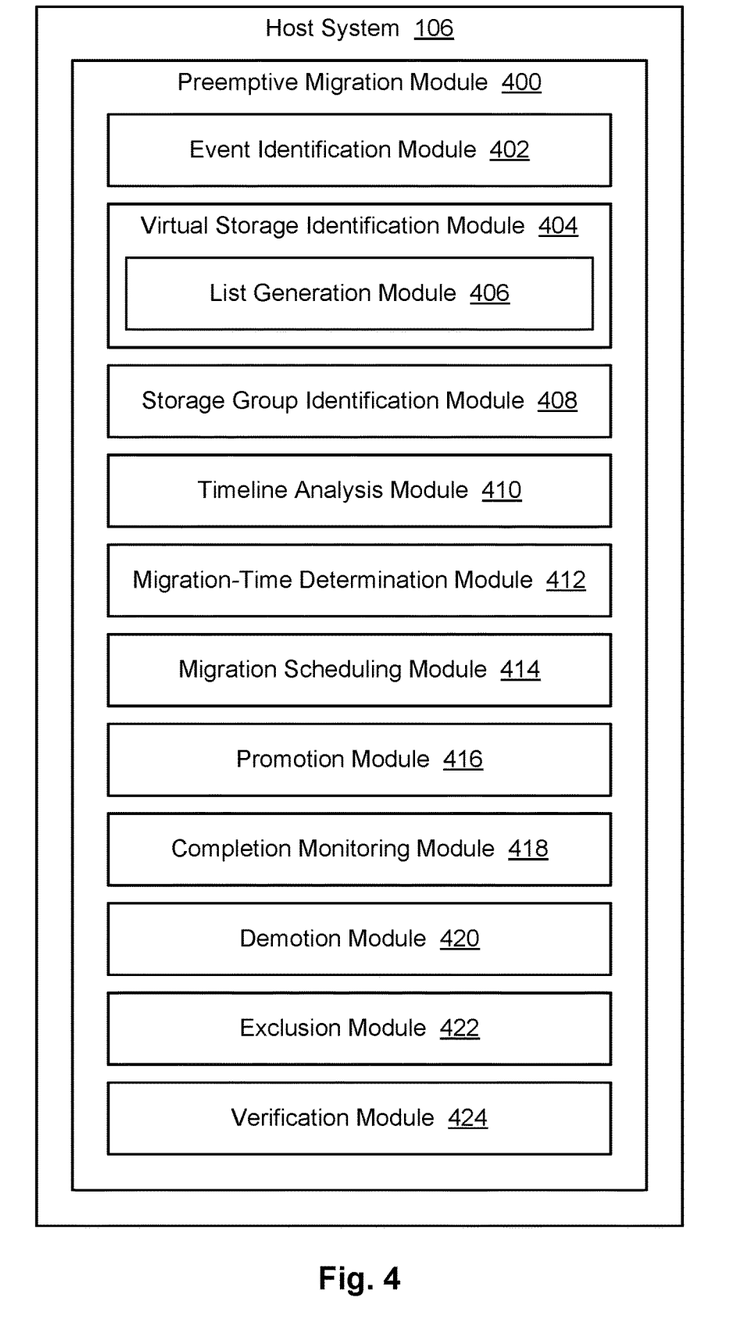
FIG. 4 shows a preemptive migration module for preemptively migrating a virtual storage resource between higher performance and lower performance storage media to accommodate I/O associated with an event.

Referring to FIG. 4, in order to improve I/O performance during an identified event 300, a preemptive migration module 400 may be provided in a host system 106 to migrate virtual storage resources 304 to higher-performing storage media 302a. The preemptive migration module 400 may include various sub-modules to provide various features and functions. These sub-modules may include one or more of an event identification module 402, virtual storage identification module 404, list generation module 406, storage group identification module 408, timeline analysis module 410, migration-time determination module 412, migration scheduling module 414, promotion module 416, completion monitoring module 418, demotion module 420, exclusion module 422, and verification module 424. These sub-modules are presented by way of example and are not intended to represent an exhaustive list of sub-modules that may be included within the preemptive migration module 400. The preemptive migration module 400 may include more or fewer sub-modules than those illustrated, or the functionality of the sub-modules may be organized differently. One embodiment of a method 500 that may be used by the preemptive migration module 400 to preemptively migrate virtual storage resources 304 between higher-performing storage media 302a and lower-performing storage media 302b will be discussed in association with FIG. 6.

The event identification module 402 may be configured to identify one or more events 300 that are associated with increased levels of I/O activity and could benefit from having virtual storage resources 304 on higher-performing storage media 302a. In certain embodiments, the event identification module 402 may analyze historical I/O data in combination with logs and/or other historical data to determine which events 300 are associated with increased I/O levels. Alternatively, or additionally, the event identification module 402 may receive user input to identify events 300 associated with increased I/O activity. In yet other embodiments, the event identification module 402 may identify events that are commonly associated with increased I/O activity, such as data backups, application use during business hours, batch jobs, and the like.

The virtual storage identification module 404 may be configured to identify virtual storage resources 304 (e.g., data sets, files, volumes, etc.) that are associated with the events 300 identified by the event identification module 402. In certain embodiments, a list generation module 406 may generate a list of virtual storage resources 304 associated with a particular event 300 or type of event 300. Similarly, the storage group identification module 408 may be configured to identify storage groups utilizing different types of storage media. For example, the storage group identification module 408 may identify storage groups that utilize faster solid state drives 204 and storage groups that utilize slower hard disk drives 204.

The timeline analysis module 410 may be configured to analyze timelines, such as system logs and/or future schedules, to determine when the events 300 identified by the event identification module 402 will occur or are likely to occur. This may be used to determine a schedule for the events 300. The timeline analysis module 410 may continuously or periodically perform this analysis to determine if the schedule has changed. Alternatively, or additionally, the timeline analysis module 410 may enable a user to enter start and/or end times or schedules associated with events 300. In general, the timeline analysis module 410 may enable the preemptive migration module 400 to determine when events 300 will occur or will likely occur.

The migration-time determination module 412 may be configured to determine an amount of time required to migrate virtual storage resources 304 between storage tiers. This time may depend on one or more of: (1) the I/O performance of the source storage group and destination storage group, as well as hardware/software transferring data between the two; (2) the size of the virtual storage resources 304; and (3) other I/O that will be occurring during the migration. In certain embodiments, the migration-time determination module 412 may determine the amount of time by actually performing the migration and recording the duration between start and completion. In other embodiments, the migration time determination module 412 may calculate the amount of time using the inputs described above. The migration time may be used to determine a lead time needed to complete migration of a virtual storage resource prior to an event 300.

Once the schedule of events 300, virtual storage resources 304, storage groups, and time required to migrate virtual storage resources 304 are known, the migration scheduling module 414 may schedule the virtual storage resources 304 for migration. This schedule may be designed to enable the virtual storage resources 304 to be promoted to higher-performing storage media 302a prior to the occurrence of the events 300. The promotion module 416 may promote the virtual storage resources 304 to higher-performing storage media 302a in accordance with this schedule. In certain cases the promotion module 416 may promote virtual storage resources 304 by assigning the virtual storage resources 304 to a higher-performing management class. Such a management class which may dictate how associated data is directed and stored on various storage tiers of a tiered storage architecture.

The completion monitoring module 418 may monitor for completion of the events 300 and the demotion module 420 may demote the virtual storage resources 304 from the higher-performing storage media 302a to the lower-performing storage media 302b when the events 300 are complete. Certain events, such as the open hours of a business (such as bank branch hours, etc.), stock-exchange trading, or the like, will have clear, well-defined end times. In such cases, the demotion module 420 may demote the virtual storage resources 304 once these end times have passed. Other events 300, such as data backups, batch jobs, and the like may not have well-defined end times. With such events, the completion monitoring module 418 may monitor for their completion, such as by receiving completion messages or detecting other indicators of completion. When the events are verified to be complete, the demotion module 420 may demote the virtual storage resources 304 to the lower-performing storage media 302b. In such cases where only logical completion is detected (such as with FlashCopy operations), the completion monitoring module 418 may perform additional checks and/or verification to monitor for actual completion of operations associated with the event 300. In the case of FlashCopy operations, the completion monitoring module 418 may query relationships and check drives where particular virtual storage resources 304 have been moved to ensure that the operation is complete. Once an event 300 is actually determined to be complete, the demotion module 420 may demote the associated virtual storage resources 304 to the lower-performing storage media 302b. One embodiment of a method 700 that may be used by the completion monitoring module 418 to monitor for completion of events 300 will be discussed in association with FIG. 7.

The exclusion module 422 may be configured to exclude particular events 300 from the preemptive migration process. In certain cases, a user may wish to leave virtual storage resources 304 on their current storage tier despite events 300 that may cause an associated increase in I/O activity. For example, some I/O, although occurring at increased levels to certain virtual storage resources 304, may not be critical or require improved I/O performance. Such virtual storage resources 304 may be left on lower-performing storage media 302b despite increased I/O activity. The exclusion module 422 may provide the user with this capability.

The verification module 424 may be configured to verify the accuracy of a migration schedule. For example, the verification module 424 may be configured to analyze historical performance data (e.g., Resource Measurement Facility (RMF) data) to determine I/O levels during the timeframe of events 300. If I/O levels do not warrant migrating virtual storage resources 304 to higher-performing storage media 302a, the verification module 424 may adjust the schedule accordingly, such as by leaving virtual storage resources 304 on their current storage tier. This may occur automatically or after notifying and requesting input from a user. One embodiment of a method 600 that may be used by the verification module 424 to verify the accuracy of a migration schedule and make adjustments thereto will be discussed in association with FIG. 6.

Figure 5:
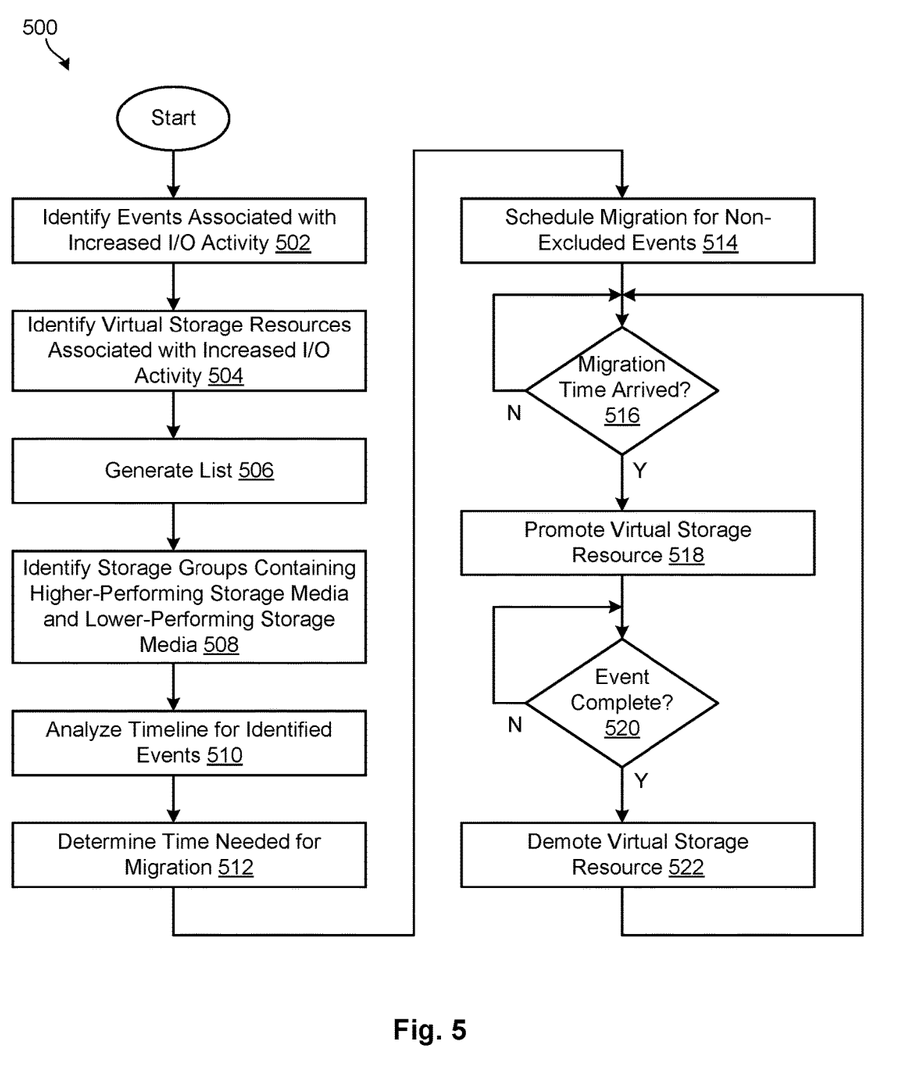
FIG. 5 shows one embodiment of a method for preemptively migrating a virtual storage resource between higher performance and lower performance storage media to accommodate I/O associated with an event.

Referring to FIG. 5, one embodiment of a method 500 for preemptively migrating virtual storage resources 304 between higher-performing storage media 302a and lower-performing storage media 302b is illustrated. As shown, the method 500 initially identifies 502 events 300 associated with an increase in I/O activity. The method 500 then identifies 504 virtual storage resources 304 associated with the increase in I/O activity and generates 506 a list of the virtual storage resources 304. The method 500 further identifies 508 storage groups containing higher-performing storage media 302a, such as solid state drives 204, and storage groups containing lower-performing storage media 302b, such as hard disk drives 204.

The method 500 then analyzes 510 a timeline, such as a system log or future schedule, to find instances of the events 300 identified at step 502. The method 500 further determines 512 an amount of time needed to migrate virtual storage resources 304, associated with the events 300, from lower-performing storage media 302b to higher-performing storage media 302a. This allows the method 500 to then schedule 514 the migration of virtual storage resources 304 for non-excluded events 300.

The method 500 then executes the schedule by determining 516 whether the migration time has arrived for any virtual storage resources 304. If so, the method 500 promotes 518 the virtual storage resources 304 from lower-performing storage media 302b to higher-performing storage media 302a. The method then determines 520 whether the event 300 associated with the migration of the virtual storage resources 304 is complete. This may include determining 520 whether the event 300 has a clearly defined end time or whether the end time is variable. If the end time is clearly defined, the method 500 demotes 522 the virtual storage resources 304 at the end time. If the end time is not clearly defined, the method 500 demotes 522 the virtual storage resources 304 when it can be verified that the event 300 is complete.

Figure 6:
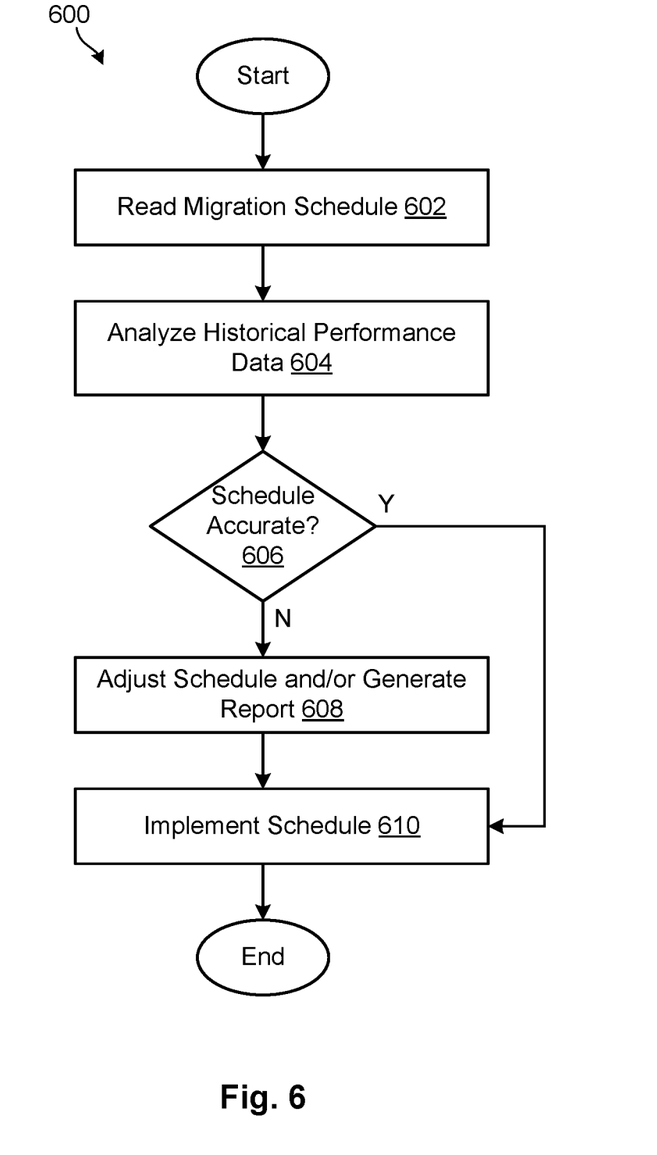
FIG. 6 shows one embodiment of a method for verifying that a migration schedule matches up with historical performance data.

Referring to FIG. 6, one embodiment of a method 600 for verifying that a migration schedule matches up with historical performance data is illustrated. As shown, the method 600 initially reads 602 the migration schedule that was established at step 514 (See FIG. 5). The method 600 then analyzes 604 historical performance data to determine I/O levels when virtual storage resources 304 are scheduled to be migrated. If, at step 606, the schedule is accurate, meaning that I/O levels warrant migrating virtual storage resources 304 to higher-performing storage media 302a, the method 600 implements 610 the schedule. If the schedule is not accurate, meaning that I/O levels do not warrant migrating virtual storage resources 304 to higher-performing storage media 302a, the method 600 adjusts 608 the schedule and/or generates 608 a report for presentation to a user. The method 600 then implements 610 the adjusted schedule.

Figure 7:
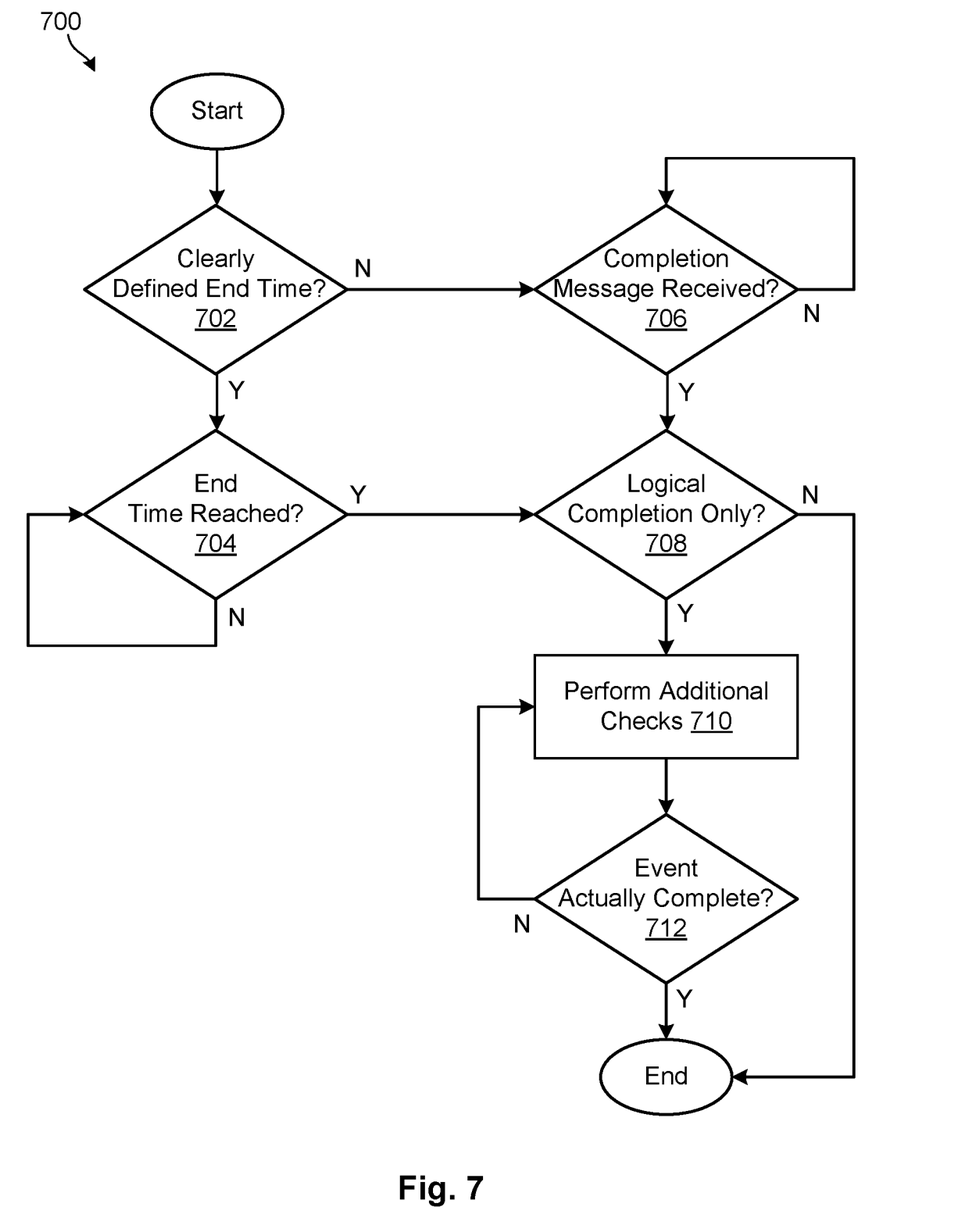
FIG. 7 shows one embodiment of a method for determining whether an event is complete.

Referring to FIG. 7, one embodiment of a method 700 for determining whether an event 300 is complete is illustrated. This method 700 may, in certain embodiments, be executed at step 520 or in place of step 520 in FIG. 5. As shown, the method 700 initially determines 702 whether the event 300 has a clearly defined end time. If the event 300 has a clearly defined end time, the method 700 waits 704 for the end time since this will indicate that the event 300 is complete. Once the end time is reached, the method 700 determines 708 whether the completion is a logical completion only. If the completion is a logical completion (as opposed to an actual completion), the method 700 performs 710 some additional checks and determines 712 whether the event 300 is actually complete. If the event 300 is actually complete, the method 700 ends. If the event 300 is not actually complete, the method 700 repeats steps 710, 712 until the event 300 is actually complete.

If, at step 702, the event 300 does not have a clearly defined end time, the method 700 determines 706 whether a completion message (or other verification) has been received, indicating that the event 300 has completed. If not, the method 700 waits 706 to receive the completion message. Once the completion message is received, the method 700 determines 708 whether the completion is a logical completion only. If the completion is a logical completion, the method 700 performs 710 additional checks and determines 712 whether the event 300 is actually complete. If the event 300 is actually complete, the method 700 ends. If the event 300 is not actually complete, the method 700 repeats steps 710, 712 until the event 300 is determined to be complete.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for preemptively migrating data in a tiered storage system, the method comprising:
   identifying a job that is associated with an increase in I/O activity;
   identifying a virtual storage resource associated with the increase in I/O activity;
   scanning a system log to find occurrences of the job and determine start and end times associated with the job;
   generating a schedule that automatically promotes the virtual storage resource from lower-performing storage media to higher-performing storage media immediately prior to the start time, and demotes the virtual storage resource to the lower-performing storage media after the end time;
   periodically scanning the system log to determine changes to the start time and end time; and
   automatically updating the schedule upon detecting changes to at least one of the start time and end time.

2. The method of claim 1, wherein promoting the virtual storage resource comprises assigning the virtual storage resource to a higher performing management class.

3. The method of claim 1, wherein demoting the virtual storage resource comprises assigning the virtual storage resource to a lower performing management class.

4. The method of claim 1, further comprising determining an amount of time needed to promote the virtual storage resource to the higher-performing storage media.

5. The method of claim 4, wherein automatically promoting comprises initiating migration of the virtual storage resource to the higher-performing storage media at least the amount of time prior to the start time.

6. The method of claim 1, further comprising monitoring for the completion.

7. The method of claim 1, wherein identifying the virtual storage resource comprises adding the virtual storage resource to a list of virtual storage resources associated with the increase in I/O activity.

8. A computer program product for preemptively migrating data in a tiered storage system, the computer program product comprising a computer-readable storage medium having computer-usable program code embodied therein, the computer-usable program code comprising:
   computer-usable program code to identify a job that is associated with an increase in I/O activity;
   computer-usable program code to identify a virtual storage resource associated with the increase in I/O activity;
   computer-usable program code to scan a system log to find occurrences of the job and determine start and end times associated with the job;

computer-usable program code to generate a schedule that automatically promotes the virtual storage resource from lower-performing storage media to higher-performing storage media prior to the start time, and demotes the virtual storage resource to the lower-performing storage media after the end time;

computer-usable program code to periodically scan the system log to determine changes to the start time and the end time; and computer-usable program code to automatically update the schedule upon detecting changes to at least one of the start time and the end time.

9. The computer program product of claim 8, wherein promoting the virtual storage resource comprises assigning the virtual storage resource to a higher performing management class.

10. The computer program product of claim 8, wherein demoting the virtual storage resource comprises assigning the virtual storage resource to a lower performing management class.

11. The computer program product of claim 8, further comprising computer-usable program code to determine an amount of time needed to promote the virtual storage resource to the higher-performing storage media.

12. The computer program product of claim 11, wherein automatically promoting comprises initiating migration of the virtual storage resource to the higher-performing storage media at least the amount of time prior to the start time.

13. The computer program product of claim 8, further comprising computer-usable program code to monitor for the completion.

14. The computer program product of claim 8, wherein identifying the virtual storage resource comprises adding the virtual storage resource to a list of virtual storage resources associated with the increase in I/O activity.

15. A system for preemptively migrating data in a tiered storage system, the system comprising:
at least one processor;
at least one memory device operably coupled to the at least one processor and storing instructions for execution on the at least one processor, the instructions causing the at least one processor to:
identify a job that is associated with an increase in I/O activity;
identify a virtual storage resource associated with the increase in I/O activity;
scan a system log to find occurrences of the job and determine start and end times associated with the job;
generate a schedule that automatically promotes the virtual storage resource from lower-performing storage media to higher-performing storage media prior to the start time, and demotes the virtual storage resource to the lower-performing storage media after the end time;
periodically scan the system log to determine changes to the start time and the end time; and
automatically update the schedule upon detecting changes to at least one of the start time and the end time.

16. The system of claim 15, wherein promoting the virtual storage resource comprises assigning the virtual storage resource to a higher performing management class.

17. The system of claim 15, wherein demoting the virtual storage resource comprises assigning the virtual storage resource to a lower performing management class.

18. The system of claim 15, wherein the instructions further cause the at least one processor to determine an amount of time needed to promote the virtual storage resource to the higher-performing storage media.

19. The system of claim 18, wherein automatically promoting comprises initiating migration of the virtual storage resource to the higher-performing storage media at least the amount of time prior to the start time.

20. The system of claim 15, wherein the instructions further cause the at least one processor to monitor for the completion.

* * * * *